Jan. 7, 1941.   W. M. BROOKS   2,227,569
SHEET MATERIAL SHACKLE SEAL
Filed June 8, 1939
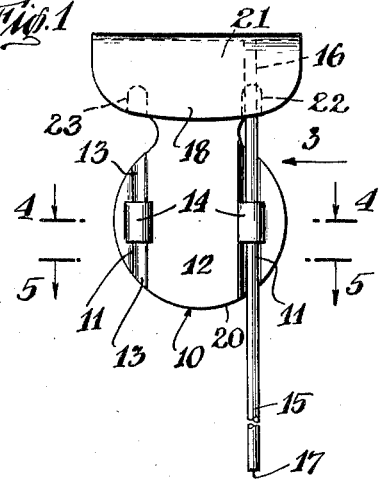
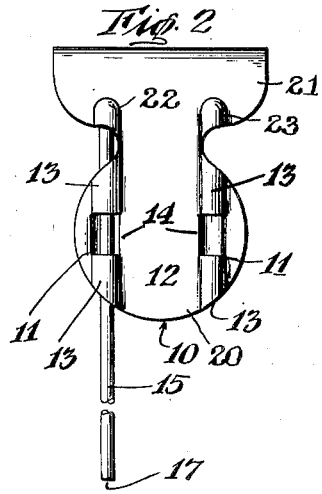
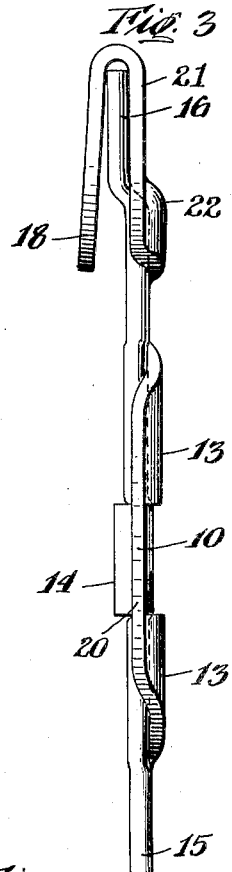
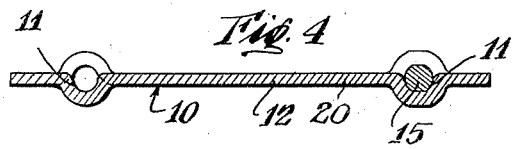
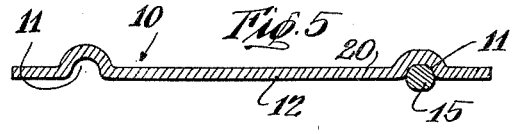
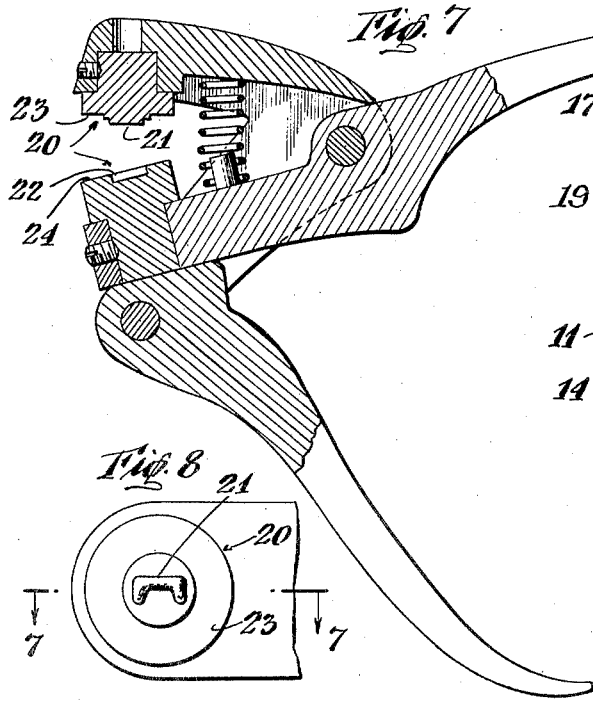
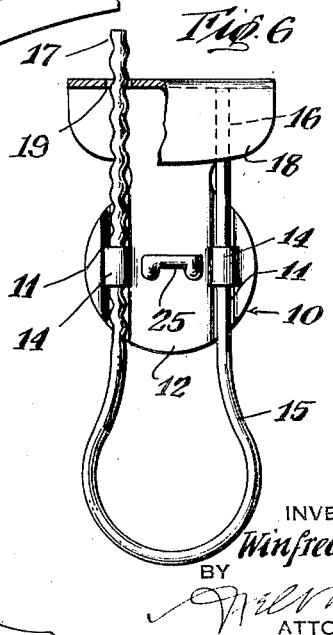
INVENTOR
Winfred M. Brooks
BY
ATTORNEY Patented Jan. 7, 1941

2,227,569

UNITED STATES PATENT OFFICE 2,227,569

SHEET MATERIAL SHACKLE SEAL

Winfred M. Brooks, West Orange, N. J., assignor to E. J. Brooks Company, Newark, N. J., a corporation of New Jersey Application June 8, 1939, Serial No. 278,055

2 Claims. (Cl. 292—310)

The present invention relates generally to shackle seals, and has for its main object and feature the production of a compressible shackle seal in which the compressible member is made of sheet material, instead of a body of lead as has heretofore been the custom, whereby a great saving in cost is effected.

In the accompanying drawing the invention is disclosed in a concrete and preferred form in which:

Fig. 1 is a face view of a shackle seal in open position;

Fig. 2 is a rear view of Fig. 1;

Fig. 3 is an edge view of Fig. 1 looking in the direction of arrow 3 of Fig. 1;

Fig. 4 is a sectional view substantially on the plane of line 4—4 of Fig. 1;

Fig. 5 is a sectional view substantially on the plane of line 5—5 of Fig. 1;

Fig. 6 is a view substantially like Fig. 1, but showing the seal closed and with the bent-over lip in section;

Fig. 7 is a sectional view of one form of punch that may be used in compressing the sheet material member, the section being substantially on the plane of line 7—7 of Fig. 8; and Fig. 8 is a plan view of one of the faces of the punch shown in Fig. 7.

10 indicates a flat sheet material member consisting of a sealing section 20 and an abutment section 21 formed integral with each other. The sealing section is to grip both legs of a shackle member, and the abutment section is to freely support the ends of the legs of the shackle member. Said sealing portion is provided with two separate channels 11 separated by an intervening portion 12. Each channel is formed of two or more oppositely facing and deflected open gripping portions 13 and 14, said gripping portions being preferably integral with the side edges of the sheet material member. The abutment section is provided with two deflected and open receiving portions 22 and 23, one in line with one and the other in line with the other of the channels of the sealing section. The said receiving portions extend only part way in said abutment section. 15 indicates a shackle, here in the form of a wire. In practice, one end 16 of the shackle is inserted in one of channels 11 and into abutment portion 22, after which the gripping portions of said channel are slightly compressed. The free end 17 of the shackle, after being passed around the article to be sealed, is then inserted in the other channel of the sealing section and into the other receiving portion 23 of the abutment section, and then the gripping portions of both channels of the sealing section are simultaneously compressed to hold both ends of the shackle firmly in position. If it is desired to extend the ends of the legs of the shackle beyond receiving portions 22 and 23, the abutment section of the sheet material member can be provided with a bent-over lip 18 adjacent one end of the channels and this lip can be imperforate so as to protect the fingers of the person handling the seal, or it may have an opening 19 through which end 17 of the shackle can be drawn. It will be apparent that, if desired, lip 18 can be provided with a symbol indicating, for instance, the manufacturer's or the user's name.

In Figs. 7 and 8 a punch 20 is shown such as can be used in compressing the sealing section of the sheet material member, and from these it will be seen that the punch can be provided with central embossing members 21 and 22 in addition to surfaces 23 and 24 that engage and compress the gripping portions of the channels. By these means not only will said gripping portions be compressed but the intervening portion 12 can, at the same time, be embossed as at 25. The sheet material member is here made of sheet tin.

I claim:

1. In a shackle seal, a flat sheet material member consisting of two integral sections, one a sealing section to grip both legs of a shackle member and the other an abutment section to freely support and protect the ends of the legs of the shackle member that is gripped by the sealing section, said sealing section having integral gripping portions constituting two separate channels for the reception of the legs of the shackle member, and said abutment section having two deflected and open receiving portions, one in line with one and the other in line with the other of said channels, said receiving portions extending only part way in said abutment section, and a shackle member having its two legs gripped by the gripping portions of the sealing section and the ends of said legs extending into the receiving portions of the abutment section.

2. In a shackle seal, a flat sheet material member consisting of two integral sections, one a sealing section to grip both legs of a shackle member and the other an abutment section to freely support and protect the ends of the legs of the shackle member that is gripped by the sealing section, said sealing section having two sets of oppositely facing and deflected gripping portions, the gripping portions of each set being in alinement with each other and forming a channel for the reception of the shackle member, and said abutment section having two deflected and open receiving portions, one in line with one and the other in line with the other of said channels, said receiving portions extending only part way in said abutment section, and a shackle member having its two legs gripped by the gripping portions of the sealing section and the ends of said legs extending into the receiving portions of the abutment section.

WINFRED M. BROOKS.